(12) United States Patent
Chiba et al.

(10) Patent No.: US 8,057,347 B2
(45) Date of Patent: Nov. 15, 2011

(54) POWER TRANSMITTING APPARATUS

(75) Inventors: Ryouhei Chiba, Shizuoka (JP); Naoyuki Miwa, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 857 days.

(21) Appl. No.: 12/109,113

(22) Filed: Apr. 24, 2008

(65) Prior Publication Data
US 2008/0269002 A1   Oct. 30, 2008

(30) Foreign Application Priority Data

Apr. 24, 2007   (JP) ................................. 2007-114192

(51) Int. Cl.
*F16H 37/08* (2006.01)
*F16H 59/00* (2006.01)
*B60K 20/00* (2006.01)
*B60K 17/35* (2006.01)

(52) U.S. Cl. .................... 475/200; 74/337.5; 74/473.37; 180/249

(58) Field of Classification Search .................. 475/200, 475/202, 220, 230; 74/335, 337.5, 473.36, 74/473.37; 180/249, 250
See application file for complete search history.

(56) References Cited

U.S. PATENT DOCUMENTS

| | | | | |
|---|---|---|---|---|
| 4,867,260 A * | 9/1989 | Cameron et al. | ............. | 180/360 |
| 5,735,176 A * | 4/1998 | Winkam et al. | ............. | 74/337.5 |
| 6,193,629 B1 * | 2/2001 | Tenzor et al. | ................. | 477/124 |
| 6,601,668 B2 * | 8/2003 | Kitai et al. | .................... | 180/233 |
| 6,880,420 B2 * | 4/2005 | Shen | ............... | 74/335 |
| 6,889,806 B2 * | 5/2005 | Handa et al. | .................... | 192/35 |
| 6,935,982 B2 | 8/2005 | Handa et al. | | |
| RE39,054 E | 4/2006 | Kagata et al. | | |
| 7,694,773 B2 * | 4/2010 | Janson et al. | ................. | 180/243 |
| 2005/0166694 A1 * | 8/2005 | Fegg | ................ | 74/335 |
| 2008/0280720 A1 * | 11/2008 | Ina et al. | ....................... | 475/230 |

FOREIGN PATENT DOCUMENTS

JP   01-141134   9/1989

(Continued)

OTHER PUBLICATIONS

Office Action from Japanese Application No. 2007-114192 of corresponding to the present U.S. Appl. No. 12/109,113.

*Primary Examiner* — Roger Pang
(74) *Attorney, Agent, or Firm* — Knobbe, Martens, Olson & Bear, LLP

(57) ABSTRACT

A power transmitting apparatus can be configured to switch between 2-wheel drive mode and 4-wheel drive mode and to lock and unlock a differential device. The power transmitting apparatus can comprise an input shaft connected to a driving power source i.e. an engine of vehicle and rotated around one rotational axis, a pair of output shafts of left and right sides for driving front wheels or rear wheels of vehicle when driving force is transmitted from the input shaft, a differential device arranged between the input shaft and the output shafts for absorbing the difference of rotation between the output shafts by differential action thereof, an operational shaft for performing connection and disconnection between the input shaft and output shafts by connecting and disconnecting the input shaft and the output shafts and also performing locking and unlocking of the differential means, a driving means for arbitrarily driving the operational shaft, and a case mounted on a vehicle and containing the differential means and the operational shaft characterized in that the input shaft extends from a rear side of the case facing toward the engine substantially in parallel with the operational shaft; and that the driving means is arranged on the rear side of the case.

8 Claims, 8 Drawing Sheets

FOREIGN PATENT DOCUMENTS

| | | |
|---|---|---|
| JP | 10-297313 | 11/1998 |
| JP | 2001-080385 | 3/2001 |
| JP | 2002-283864 | 10/2002 |
| JP | 2003-191768 | 7/2003 |
| JP | 2003-214525 | 9/2003 |
| JP | 2005-324719 | 11/2005 |
| WO | WO93/21462 | 10/1993 |

* cited by examiner

[ Fig 1 ]
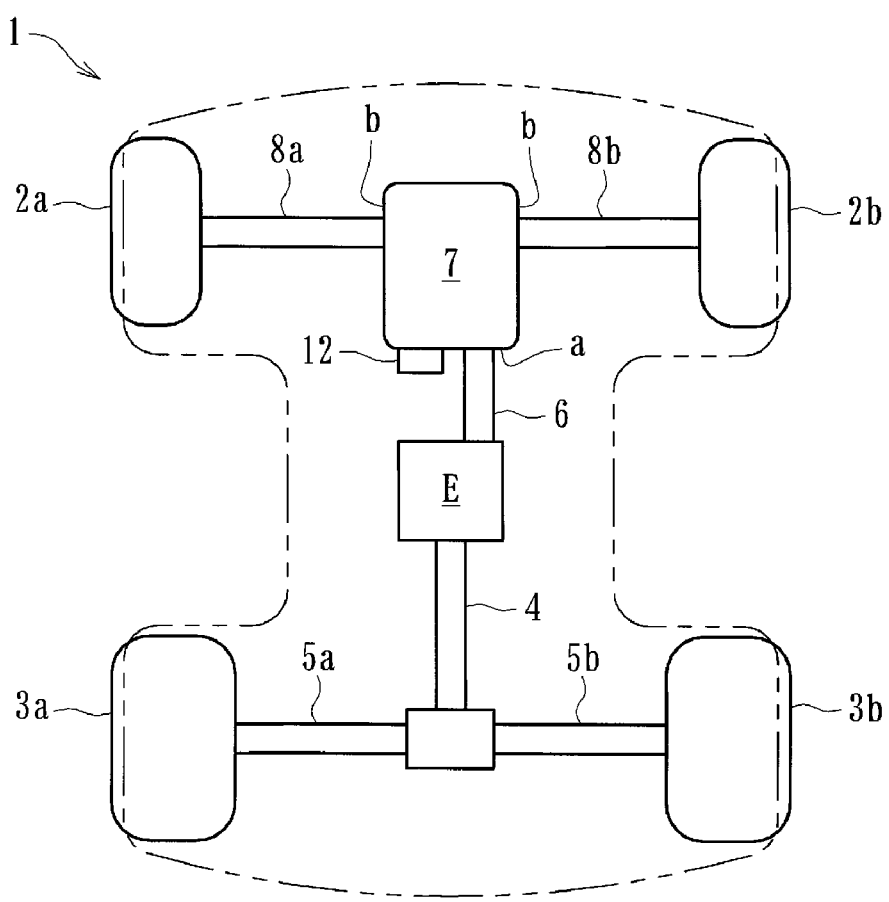

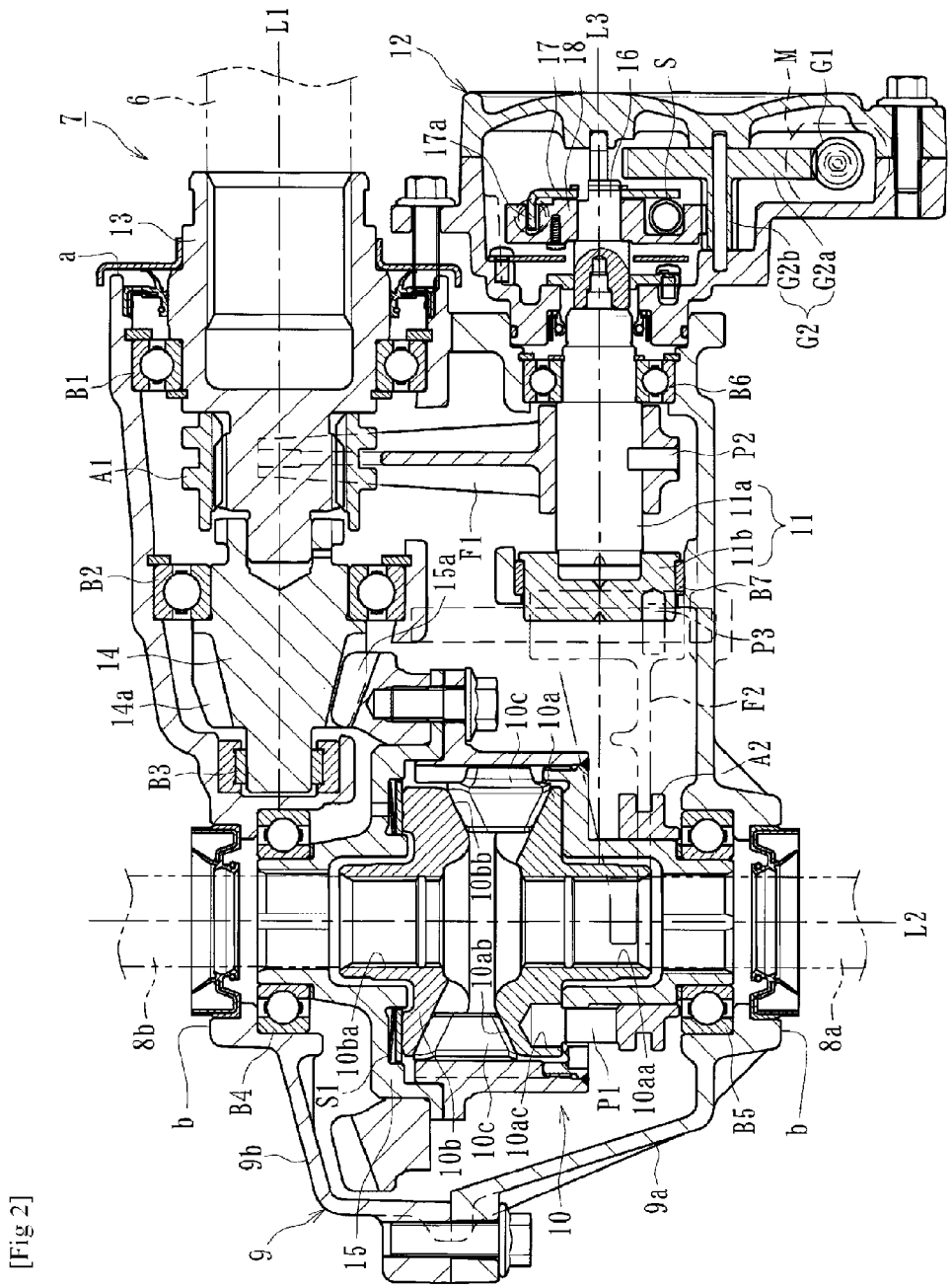
[Fig 2]

[Fig 3]
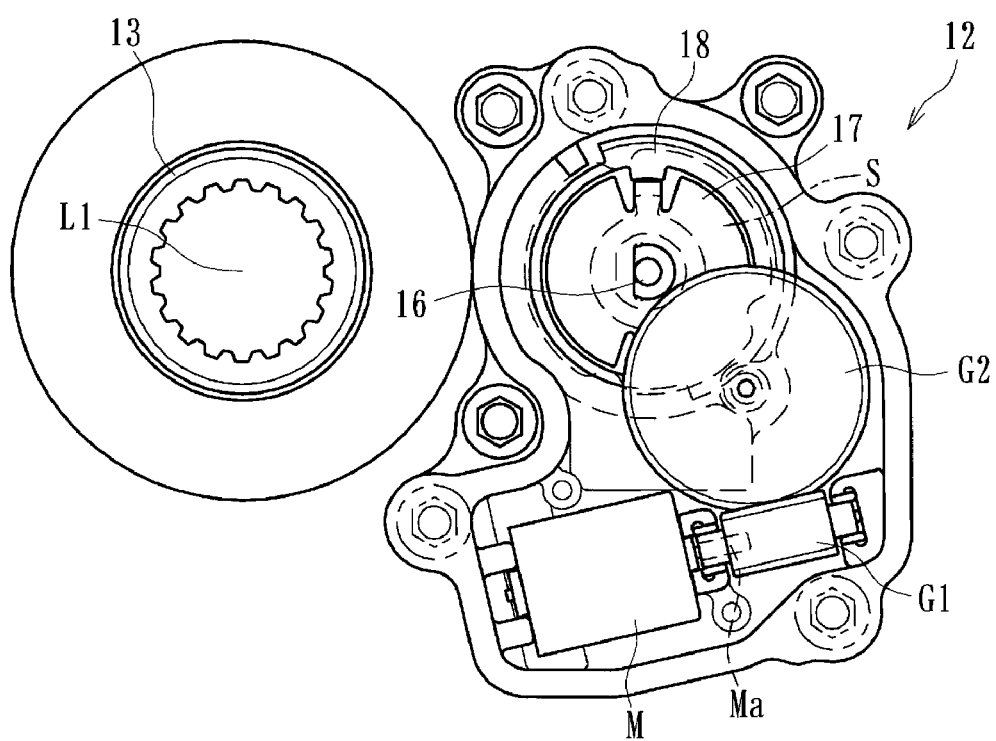

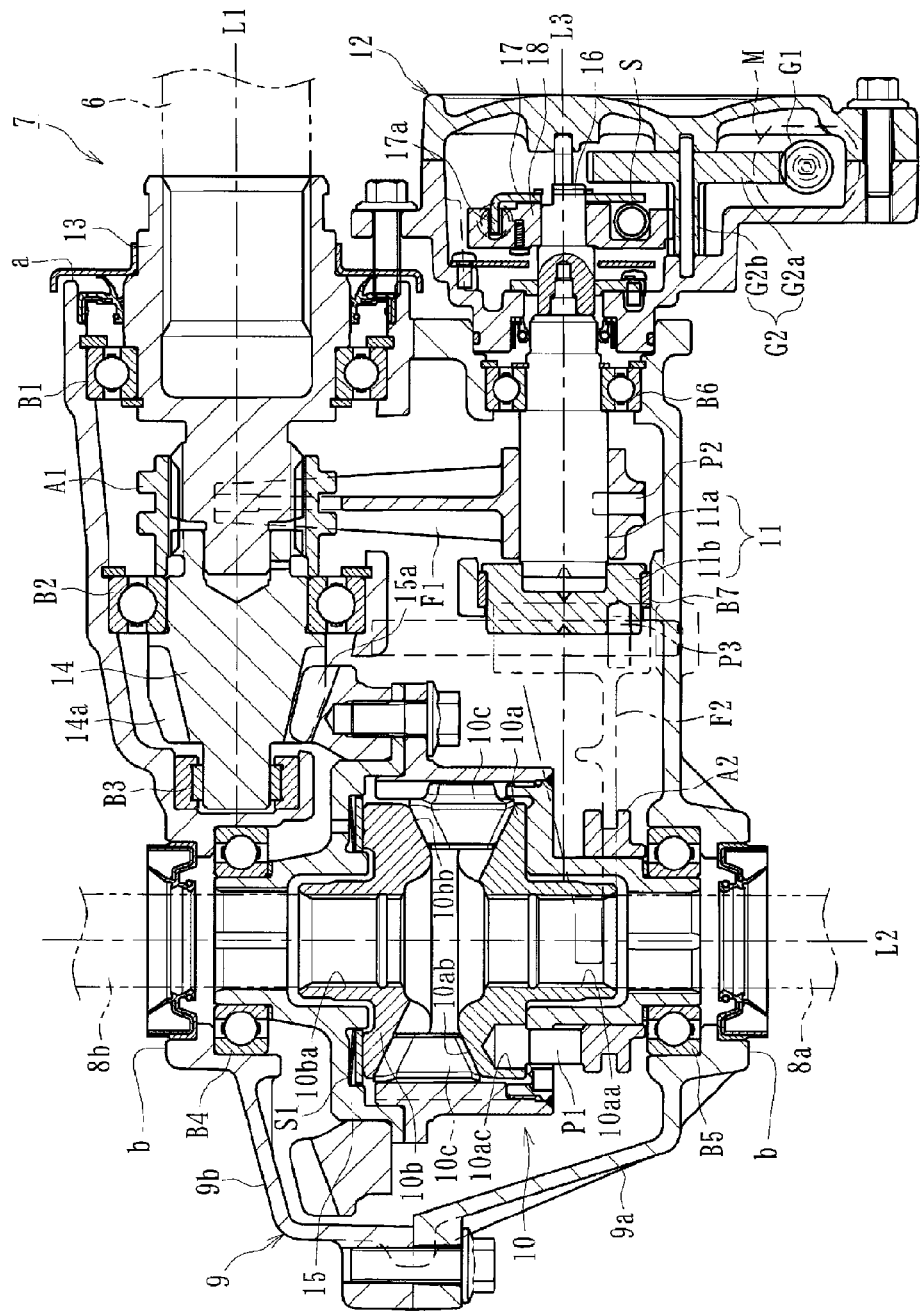
[Fig 4]

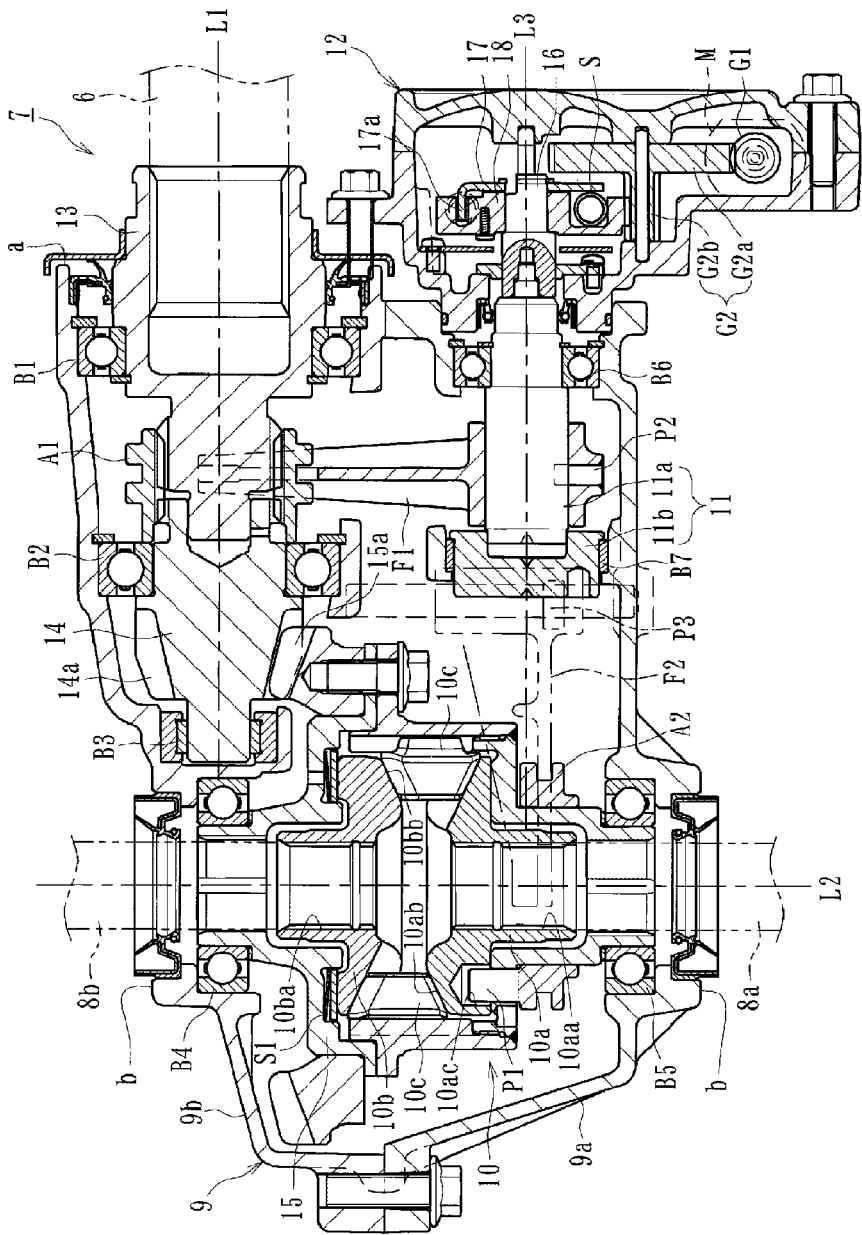
[Fig 5]

[ Fig 6 ]
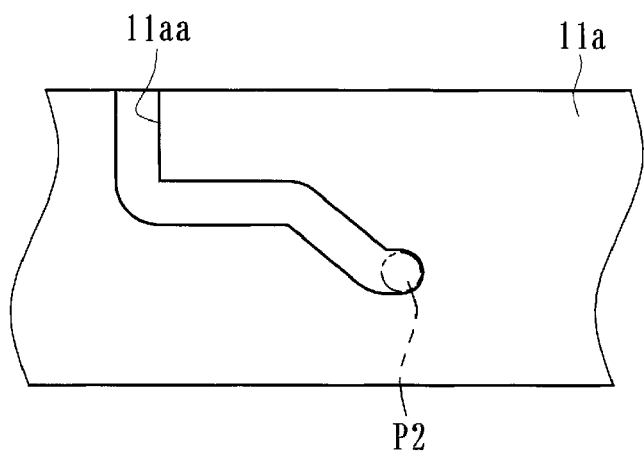
[ Fig 7 ]
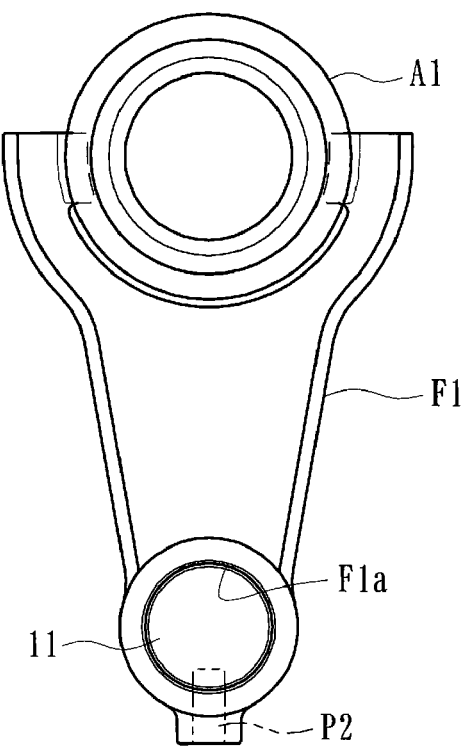

[Fig 8]
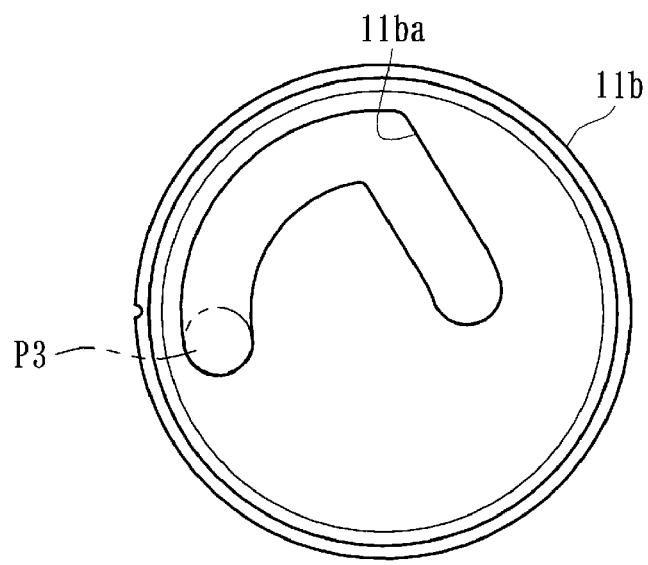
[Fig 9]
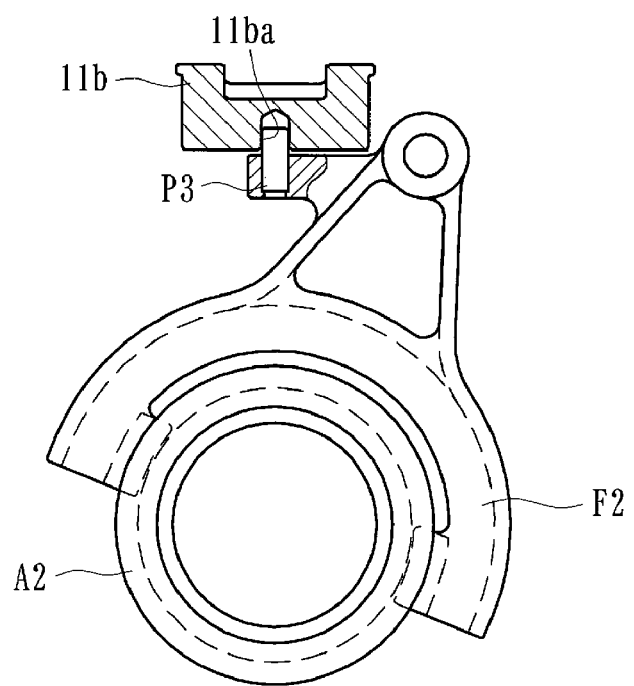

[ Fig 10 ]
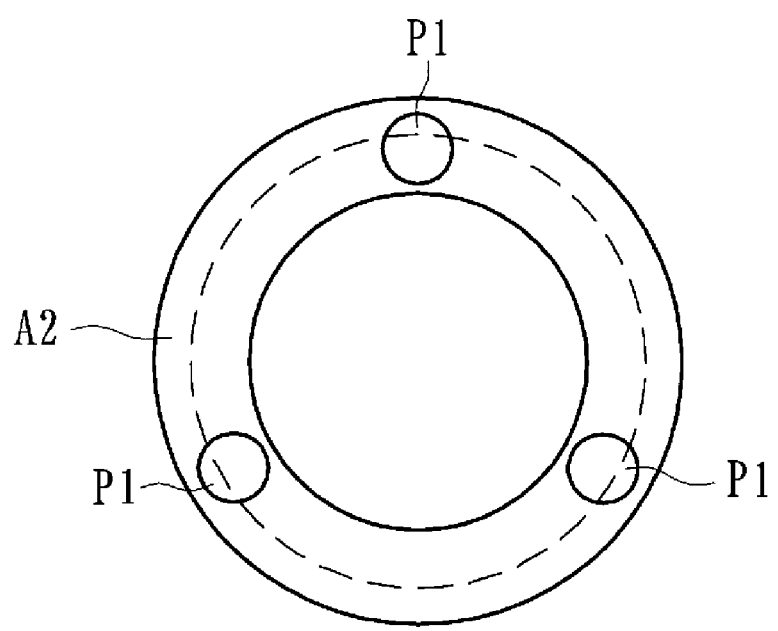

POWER TRANSMITTING APPARATUS

PRIORITY INFORMATION

This application is based on and claims priority under 35 U.S.C. §119 to Japanese Patent Application No. 2007-114192, filed on Apr. 24, 2007, the entire contents of which is hereby expressly incorporated by reference herein.

BACKGROUND OF THE INVENTIONS

1. Field of the Inventions

The present inventions relate to power transmitting apparatuses for switching between 2-wheel and 4-wheel modes and locking and unlocking differential devices.

2. Description of the Related Art

Four-wheel buggies, also known as "ATVs" (All Terrain Vehicles), usually include power transmitting apparatuses for connecting and disconnecting power from an engine to the front wheels, which are not-driven wheels, and also switching between 2-wheel and 4-wheel drive modes. Such a vehicle is disclosed in Japanese Laid-open Patent Publication No. 191768/2003.

Generally, the power transmitting apparatus is provided with a differential means (differential gear set) to provide smooth turning of vehicle by absorbing the difference of rotation between left and right wheels. Japanese Laid-open Patent Publication No. 509409/1994 discloses another type of differential system that does not a differential gear set.

Some known designs can limit the differential action of one wheel by incorporating a power transmitting apparatus provided with means for locking the differential means (differential-locking means) in order to prevent a reduction of driving torque under circumstances in which one of left and right wheels of vehicle would be mired in a slippery road such as mud. A more recently proposed design of a power transmitting apparatus include a motor for connecting and disconnecting the driving force and locking and unlocking of a differential means.

For example, one prior art power transmitting apparatus includes an electric motor arranged in either of the left or right sides of a case forming a box of the power transmitting apparatus. The connection and disconnection between an input shaft connected to an engine and an output shaft connected to a front wheel as well as the locking and unlocking of a differential means are performed by actuating a fork connected to an actuator driven by the electric motor.

SUMMARY OF THE INVENTIONS

An aspect of at least one of the inventions disclosed herein includes the realization that there is a problem in the power transmitting apparatus of the prior art in that the movable range of a tie rod etc. of a front wheel is greatly limited since an electric motor is arranged in either one of left and right sides (width-wise sides of vehicle) of a case forming a box of the power transmitting apparatus. That is, since the power transmitting apparatus is usually arranged between left and right front wheels (rear wheels when the front wheels are driving wheels), if a large structural element such as an electric motor is arranged in one width-wise side of the power transmitting apparatus, the electric motor interferes with a tie rod etc. forming a steering linkage connected to left and right wheels of vehicle and thus the movable range of a tie rod etc. is greatly limited.

Accordingly it is an object of at least one of the inventions disclosed herein to provide a power transmitting apparatus which can avoid an interference with a tie rod etc. of a steering linkage of vehicle and thus improve the degree of freedom of movable range of the steering linkage.

Thus, in accordance with an embodiment, a power transmitting apparatus can be configured to switch between 2-wheel drive mode and 4-wheel drive mode and locking and unlocking of differential means by an operational shaft. The power transmitting apparatus can comprise an input shaft connected to a driving power source comprising an engine of a vehicle and rotated around a rotational axis. One pair of output shafts of left and right sides can be provided for driving front wheels or rear wheels of the vehicle when a driving force is transmitted from the input shaft. A differential means can be arranged between the input shaft and the output shafts for absorbing the difference of rotation between the output shafts by a differential action thereof. An operational shaft can be configured to connect and disconnect the input shaft and output shafts and to lock and unlock the differential means. A driving means can be provided for arbitrarily driving the operational shaft. Additionally, a case can be mounted on a vehicle and containing the differential means and the operational shaft. The input shaft can extend from a rear side of the case facing toward the engine substantially in parallel with the operational shaft, and the driving means can be arranged on the rear side of the case.

In some embodiments, further improvements can be achieved where the operational shaft is formed with a side face cam groove and an end face cam groove respectively on the side face and the end face of the operational shaft, and that the connection and disconnection between the input shaft and the output shafts and the locking and unlocking of the differential means are performed by actuating forks respectively along the side face cam groove and the end face cam groove in accordance with the rotation of the operational shaft.

In some embodiments, further improvements can be achieved where the fork corresponding to the end face cam groove is arranged so that it lies on an extension line of the operational shaft.

In some embodiments, further improvements can be achieved where the fork corresponding to the side face cam groove is mounted so that its base end straddles on the operational shaft and that the fork moves along the side face cam groove with being guided by the operational shaft.

In accordance with another embodiment, a power transmitting apparatus can be configured to switch between 2-wheel drive and 4-wheel drive modes and locking and unlocking of differential device by an operational shaft. The power transmitting apparatus can comprise an input shaft connected to a driving power source comprising an engine of a vehicle and rotated around a rotational axis. A pair of output shafts of left and right sides can be configured to drive front wheels or rear wheels of the vehicle when a driving force is transmitted from the input shaft. A differential device can be arranged between the input shaft and the output shafts and can be configured to absorb a difference of rotation between the output shafts by a differential action thereof An operational shaft can be configured to connect and disconnect the input shaft and output shafts and to lock and unlock the differential device. A driving device can be configured to drive the operational shaft. Additionally, a case can be mounted on a vehicle and can contain the differential device and the operational shaft. The input shaft can extend from a rear side of the case facing toward the engine substantially in parallel with the operational shaft, and the driving device can be arranged on the rear side of the case.

BRIEF DESCRIPTION OF THE DRAWINGS

Additional advantages and features of the present inventions will become apparent from the subsequent description and the appended claims, taken in conjunction with the accompanying drawings, wherein:

FIG. 1 is a schematic view showing a vehicle to which the power transmitting apparatus according to several embodiments can be applied;

FIG. 2 is a cross sectional view showing whole the power transmitting apparatus of an embodiment;

FIG. 3 is a schematic view showing the inside structure of driving means of the power transmitting apparatus;

FIG. 4 is a cross sectional view showing whole the power transmitting apparatus of an embodiment in a condition switched to a 4-wheel drive mode;

FIG. 5 is a cross sectional view showing whole the power transmitting apparatus of an embodiment in a locked condition of the differential means;

FIG. 6 is a side elevational view of the operational shaft showing a side face cam groove of the power transmitting apparatus;

FIG. 7 is a schematic view showing a fork engaged with the side face cam groove of the power transmitting apparatus;

FIG. 8 is an end view of the operational shaft showing the end face cam groove of the power transmitting apparatus;

FIG. 9 is a schematic view showing the fork engaging the end face cam groove of the power transmitting apparatus; and FIG. 10 is a schematic view showing the sleeve engaging the fork actuated along the end face cam groove.

DETAILED DESCRIPTION OF THE PREFERRED EMBODIMENT

As shown in FIG. 1 some embodiments of a power transmitting apparatus can be mounted between front wheels 2a and 2b in a front region of a vehicle such as a 4-wheel buggy or an ATV (All Terrain Vehicle) for switching between 2-wheel and 4-wheel drive modes as well as locking and unlocking of a differential means. The power transmitting apparatus is disclosed in the context of an ATV because it has particular utility in this context. However, the power transmitting apparatus can be used in other contexts, such as, for example, but without limitation, other vehicles including land vehicles.

As shown in FIG. 1 a drive shaft 4 extends from an engine (driving power source) "E" toward the rear of a vehicle to drive rear wheels 3a and 3b respectively via driving shafts 5a and 5b (also known as "half shafts"). Another drive shaft 6 (input shaft) also extends from the engine "E" and is connected to the power transmitting apparatus 7. These drive shafts 4 and 6 are connected to the engine "E" to be rotated around their longitudinal axes.

A pair of left and right driving shafts (output shafts, also known as "half shafts") 8a and 8b are connected to left and right sides "b" of the power transmitting apparatus 7 and drive the front wheels 2a and 2b of the vehicle 1 when driving force of the drive shaft 6 is transmitted to the power transmitting apparatus. That is, when the vehicle 1 is in the 4-wheel drive mode, since the driving force of engine "E" inputted to the power transmitting apparatus 7 is transmitted to the front wheels 2a and 2b via the driving shafts 8a and 8b, the front wheels 2a and 2b are also rotated in addition to the rear wheels 3a and 3b. On the other hand, when the vehicle 1 is in the 2-wheel drive mode, the driving force of the engine "E" inputted to the power transmitting apparatus 7 is not transmitted to the driving shafts 8a and 8b and thus the front wheels 2a and 2b are not driven by the engine E, as described in more detail below.

As shown in FIGS. 2 and 3, the power transmitting apparatus 7 can have a case 9 formed by two halves (left side case 9a and right side case 9b) for containing therein a driving member 13, a driven member 14, a differential means (differential apparatus) 10, and an operational shaft 11 etc. For example, the driving shaft 8a can extend from a side "b" of the left side case 9a, the driving shaft 8b can extend from a side "b" of the right side case 9b, and the drive shaft 6 can extend from a rear side "a" of the right side case 9b facing to the engine "E".

The driving member 13 can be rotationally supported by a bearing B1 and connected to the drive shaft 6 via a spline fitting and thus can be rotated together with the drive shaft 6 around an axis L1. The driven member 14 can be rotationally supported by bearings B2 and B3 and connected to the driving member 13 via a sleeve A1 mentioned later and thus rotated around the axis L1 when the rotational driving force is transmitted thereto. Teeth 14a forming a gear can be formed on a circumferential surface of the driven member 14 and mesh with teeth 15a of the housing 15 of the differential means 10. Accordingly, the housing 15 can be rotated via meshing of teeth 14a and 15a when the driven member 14 is rotated.

In a well known manner, the differential means 10 can be used for obtaining smooth turning of the vehicle 1 by absorbing the difference of rotation between the driving shafts 8a and 8b due to differential of output cam member 10a and 10b interposed between the drive shaft 6 and the driving shafts 8a and 8b. For example, similarly to that disclosed in Japanese Laid-open Patent Publication No. 509409/1994, the pair of output cam member 10a and 10b having splines 10aa and 10ba for receiving splines of the driving shafts 8a and 8b can be contained within the housing 15 and arranged so that they can rotate relative to the housing 15 around an axis L2.

The output cam members 10a and 10b can be formed with wave-shaped cam surfaces 10ab and 10bb respectively. The cam surface 10ab can be formed for example by an annular zigzagged surface comprising seven pairs of mutually inclined helical surfaces and the cam surface 10bb can be formed by eight pairs of mutually inclined helical surfaces corresponding to the cam surface 10ab. A plurality of cam followers 10c can be arranged between these cam surfaces 10ab and 10bb. A reference numeral S1 in drawings denotes a leaf spring for urging the output cam member 10b toward the cam member 10a.

During running of the vehicle 1 on a straight way, the cam followers 10c apply load to the cam surfaces 10ab and 10bb so as to rotate the cam members 10a and 10b at same speed as that of the housing 15, and on the contrary during running of the vehicle 1 on a curved way, there is caused a difference in rotational speed between the cam members 10a and 10b due to the difference of numbers of the cam surfaces 10ab and 10bb of the output cam members 10a and 10b. That is, during turning of the vehicle 1, the output cam members 10a and 10b rotate at different speeds relative to the housing 15 and thus absorb the difference of the number of rotation between the driving shafts 8a and 8b (i.e. difference of rotational speed between the inner wheel and the outer wheel of the front wheels 2a and 2b).

The operational shaft 11 has one function of connection and disconnection between the drive shaft (input shaft) 6 and driving shafts (output shafts) 8a and 8b and thus connection and disconnection of the transmission of rotational force of the drive shaft 6 to the driving shafts 8a and 8b, and another function of locking and unlocking of the differential action of the differential means 10 (differential-locking operation). That is, the operational shaft 11 rotates around the axis L3 and can perform the connection and disconnection between the input shaft 6 and output shafts 8a and 8b as well as the differential-locking operation of the differential means 10.

In some embodiments, the operational shaft 11 can comprise a smaller diameter portion 11a and a larger diameter portion 11b mounted on one end of the smaller diameter portion 11a and the smaller diameter portion 11a is rotationally supported by a bearing B6 and the larger diameter portion 11b can be rotationally supported by a bush B7. The smaller diameter portion 11a and the larger diameter portion 11b are simultaneously rotated around the axis L3 when they are driven by a driving means 12 later mentioned. That is, both ends of the operational shaft 11 are rotationally supported as a whole by the bearing B6 and the bush B7.

As shown in FIG. 6, the side face of the operational shaft 11 (the side face of the smaller diameter portion 11a) can be formed with a side face cam groove 11aa for actuating a first fork F1 and a pin P2 can be adapted to be inserted into the side face cam groove 11aa. The base end of the first fork F1 can be formed with an aperture F1$_a$ for passing the operational shaft 11 (smaller diameter portion 11a) therethrough as shown in FIG. 7. That is, the first fork F1 can be straddled on the operational shaft 11 at the base end thereof and the pin P2 can be press fitted in the base end of the first fork F1 at the bottom of the aperture F1a so that it is directed to the side face cam groove 11aa.

Accordingly when the operational shaft 11 is rotated the pin P2 can be moved along the side face cam groove 11aa and thus the first fork F1 can be moved along the operational shaft 11. The fore end of the first fork F1 can be engaged with a sleeve A1 and the sleeve A1 can be moved along the driving member 13 toward a spline formed on the driven member 14 and engage therewith as shown in FIG. 4. Thus the driving member 13 and the driven member 14 are connected each other and accordingly the drive shaft 6 and the driving shafts 8a and 8b are also connected. In this condition, the front wheels 2a and 2b function as driving wheels and the vehicle 1 is now switched to the 4-wheel drive mode.

Thereafter when the operational shaft 11 is rotated in a reverse direction, the pin P2 can be moved along the side face cam groove 11aa and accordingly the first fork F1 can be guided on the operational shaft 11 and returned to its initial position shown in FIG. 2. Thus the sleeve A1 can be also returned its initial position shown in FIG. 2 and the driving member 13 and the driven member 14 are disconnected. Thus the vehicle 1 is now switched again from the 4-wheel drive mode to the 2-wheel drive mode.

On the other hand, the end face of the larger diameter portion 11b of the operational shaft 11 can be formed with an end face cam groove 11ba for actuating a second fork F2 and a pin P3 can be adapted to be inserted therein as shown in FIG. 8. As shown in FIG. 9, the second fork F2 can be arranged so that it lies on an extension line of the operational shaft 11 (axis L3). The pin P3 can be press fitted in the base end of the second fork F2 and the fore end of the second fork F2 can be engaged with a sleeve A2.

Accordingly when the operational shaft 11 is rotated, the pin P3 is moved along the end face cam groove 11ba and thus the second fork F2 is actuated to move the sleeve A2 upward in FIG. 2. The end face cam groove 11ba can be structured so that it actuate the second fork F2 after the drive shaft 6 and the driving shafts 8a and 8b are connected with the first fork F1 can be being actuated due to the rotation of the operational shaft 11.

As shown in FIG. 10, a plurality (three in the illustrated embodiment) of pins P1 are integrally mounted on the sleeve A2 and they are adapted to be inserted in apertures 10ac formed in the output cam member 10a as shown in FIG. 5. When the pins P1 are inserted in the apertures 10ac of the output cam member 10a, the output cam member 10a is connected to the housing 15 and thus there is caused the differential-locking condition.

Thereafter when the operational shaft 11 is rotated in a reverse direction, the pin P3 is moved along the end face cam groove 11ba and accordingly the second fork F2 is returned to its initial position shown in FIG. 2. Thus the sleeve A2 is also returned its initial position shown in FIG. 2 and the pins P1 are pulled out from the apertures 10ac of the output cam member 10a. Thus the vehicle 1 is now returned again to the differential-unlocking condition permitting the differential action of the differential means 10.

As shown in FIG. 3, the driving means 12 mainly comprises an electric motor "M", a gear combination formed by a worm gear G1 and a gear G2, a spring "S", a rotational shaft member 16, and a rotational member 18. The motor "M" can rotate its output shaft "Ma" in the reverse direction. The worm gear G1 is connected to the output shaft "Ma" of the motor "M" and rotated by the motor "M".

The gear G2 can comprise a larger gear G2a and a smaller gear G2b (FIG. 2). The larger gear G2a mates the worm gear G1 and the smaller gear G2b mates teeth formed on a circumferential surface of the rotational member 18. The rotational member 18 contains therein the spring "S" along its circumferential direction and is rotatable around the axis L3 together with the spring "S" interlocking with rotation of the gear G2.

The rotational shaft member 16 passes through the center of the rotational member 18 and rotated around the axis L3. A connecting member 17 is secured on the end face of the rotational shaft member 16 and a bent portion 17a is formed on the connecting member 17 so that it abuts one end of the spring "S". Accordingly when the rotational member 18 is rotated, its rotational force is transmitted to the connecting member 17 via the spring "S" to rotate the rotational shaft member 16.

The rotational shaft member 16 is engaged with one end of the operational shaft 11 and thus the operational shaft 11 can be arbitrarily rotated by the motor "M". That is, the rotational force of the motor "M" is transmitted successively to the worm gear G1, the gear G2, the rotational member 18, the spring "S", the connecting member 17 and the rotational shaft member 16 and thus the operational shaft 11 engaged with the rotational shaft member can be rotated.

Then the operation of the power transmitting apparatus 7 is described below.

Firstly in order to switch the vehicle 1 from the 2-wheel drive mode to the 4-wheel drive mode, the motor "M" is actuated to rotate the operational shaft 11 (the smaller diameter portion 11a and the larger diameter portion 11b) around the axis L3. This causes the fork F1 to be slid along the smaller diameter portion 11a of the operational shaft 11 in order to engage the splines of the sleeve A1 and the driven member 14 each other. When the spline of the sleeve A1 does not align the corresponding spline of the driven member 14, the rotation of the driving means 12 (e.g. the rotational member 18) is absorbed due to contraction of the spring "S".

Accordingly the rotation of the operational shaft 11 is stopped until the spline of the sleeve A1 is engaged with the spline of the driven member 14 with continuing the actuation of the motor "M". When the spline of the sleeve A1 is engaged with the corresponding spline of the driven member 14, the spring "S" extends to move the sleeve A1 to the specific position and to fit the splines of the sleeve A1 and the driven member 14 each other. Thus the driving member 13 and the driven member 14 are connected each other. Accordingly the drive shaft 6 and the driving shaft 8a and 8b are also connected each other and thus the driving force of the engine "E"

is transmitted to both the rear wheels 3a and 3b and the front wheels 2a and 2b (4-wheel drive mode).

During the operational process mentioned above the pin P3 is kept in the circular arc portion of the end face cam and thus the second fork F2 is not actuated. If desiring locking of the differential means 10 (differential-locking), the motor "M" is further rotated to rotate the operational shaft 11 (the smaller diameter portion 11a and the larger diameter portion 11b) around the axis L3. This causes the second fork F2 to be moved along the end face cam groove 11ba of the larger diameter portion 11b. Thus the sleeve A2 is moved upward in FIG. 2 to cause the pins P1 to be inserted into the aperture 10ac of the output cam member 10a. When the pins P1 of the sleeve A2 do not align the aperture 10ac, the rotation of the driving means 12 (concretely the rotational member 18) is absorbed due to contraction of the spring "S".

Accordingly the rotation of the operational shaft 11 is stopped until the pins P1 of the sleeve A2 align the aperture 10ac with continuing the actuation of the motor "M". When the pins P1 are aligned with the corresponding apertures 10ac, the spring "S" extends to move the sleeve A2 to the specific position and to insert the pins P1 into the apertures 10ac. Thus the output cam member 10a and the housing 15 are connected each other and the differential action of the differential means 10 is locked (differential-locking).

If rotating the motor "M" in the reverse direction, the operational shaft 11 is also rotated in the reverse direction around its axis L3. Accordingly the unlocking of the differential means 10 (differential-unlocking) as well as disconnection of the drive shaft 6 and the driving shafts 8a and 8b (2-wheel drive mode) can be performed successively. That is, according to the power transmitting apparatus 7 of the present invention, it is possible to arbitrarily perform the switching between the 2-wheel drive mode and the 4-wheel drive mode of the vehicle 1 as well as locking and unlocking of the differential means 10 by the operational shaft 11.

In accordance with some embodiments of the power transmitting apparatus, the input shaft i.e. the drive shaft 6, extends from a rear side "a" of the case 9 facing toward the engine "E" substantially in parallel with the operational shaft 11 and the driving means 12 is arranged on the rear side "a" of the case 9. Accordingly, since the electric motor "M" is not at a left or right side "b" of the case 9 of the power transmitting apparatus 7, it is possible to avoid the interference between the motor "M" and a tie rod etc. of a steering link apparatus and to improve the degree of freedom of movable range of the tie rod etc.

In addition, in accordance with some embodiments of the power transmitting apparatus, since the operational shaft 11 is formed with the side face cam groove 11aa for actuating the first fork F1 and the end face cam groove 11ba for actuating the second fork F2 respectively on the side face and the end face of the operational shaft, and the connection and disconnection between the drive shaft 6 and the driving shafts 8a and 8b as well as the locking and unlocking of the differential means 10 are performed by the rotation of the operational shaft 11, it is possible to surely perform the switching between the 2-wheel drive mode and 4-wheel drive mode as well as the locking and unlocking of the differential means 10 with actuating the driving means 12.

Furthermore since the second fork F2 corresponding to the end face cam groove 11ba is arranged so that it lies on an extension line of the operational shaft 11, it is possible to set the width-wise dimension of the case 9 of the power transmitting apparatus more small and thus to more effectively avoid the interference between the tie rod etc. In addition since the first fork F1 corresponding to the side face cam groove 11aa is mounted so that its base end straddles on the operational shaft 11, and the first fork F1 moves along the side face cam groove 11aa with being guided by the operational shaft 11, it is possible to dispense with a separate guiding member for guiding the first fork F1 and thus to further reduce the size of the power transmitting apparatus 7.

Some embodiments of the power transmitting apparatus disclosed herein can be applied to any power transmitting apparatus that has its input shaft extending from the rear face of a case of the apparatus facing to an engine of an associated vehicle substantially in parallel with an operational shaft although it has a different outline configuration or other functions.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A power transmitting apparatus configured to switch between 2-wheel drive mode and 4-wheel drive mode and locking and unlocking of differential means by an operational shaft, comprises:

an input shaft connected to a driving power source comprising an engine of a vehicle and rotated around a rotational axis;

a pair of output shafts of left and right sides for driving front wheels or rear wheels of the vehicle when a driving force is transmitted from the input shaft;

a differential means arranged between the input shaft and the output shafts for absorbing the difference of rotation between the output shafts by a differential action thereof;

an operational shaft configured to connect and disconnect the input shaft and output shafts and to lock and unlock the differential means, a driving the operational shaft, and a case mounted on a vehicle and containing the differential means and the operational shaft, wherein the input shaft extends from a rear side of the case facing toward the engine substantially in parallel with the operational shaft, and wherein the driving means is arranged on the rear side of the case, and wherein the operational shaft is formed with a side face cam groove and an end face cam groove respectively on the side face and the end face of the operational shaft, and wherein the connection and disconnection between the input shaft and the output shafts and the locking and unlocking of the differential means are performed by an actuating fork respectively along the side face cam groove and the end face cam groove in accordance with the rotation of the operational shaft.

2. A power transmitting apparatus of claim 1 wherein the fork corresponding to the end face cam groove is arranged so that it lies on an extension line of the operational shaft.

3. A power transmitting apparatus of claim 1, wherein the fork corresponding to the side face cam groove is mounted so that its base end straddles on the operational shaft and wherein the fork moves along the side face cam groove, guided by the operational shaft.

4. A power transmitting apparatus of claim 2, wherein the fork corresponding to the side face cam groove is mounted so that its base end straddles on the operational shaft and wherein the fork moves along the side face cam groove, guided by the operational shaft.

5. A power transmitting apparatus configured to switch between 2-wheel drive and 4-wheel drive modes and locking and unlocking of differential device by an operational shaft, comprises:
- an input shaft connected to a driving power source comprising an engine of a vehicle and rotated around a rotational axis;
- a pair of output shafts of left and right sides configured to drive front wheels or rear wheels of the vehicle when a driving force is transmitted from the input shaft;
- a differential device arranged between the input shaft and the output shafts and configured to absorb a difference of rotation between the output shafts by a differential action thereof;
- an operational shaft configured to connect and disconnect the input shaft and output shafts and to lock and unlock the differential device;
- a driving device configured to drive the operational shaft; and
- a case mounted on a vehicle and containing the differential device and the operational shaft;
- wherein the input shaft extends from a rear side of the case facing toward the engine substantially in parallel with the operational shaft, and wherein the driving device is arranged on the rear side of the case, and wherein the operational shaft is formed with a side face cam groove and an end face cam groove respectively on the side face and the end face of the operational shaft, and wherein the connection and disconnection between the input shaft and the output shafts and the locking and unlocking of the differential device are performed by an actuating fork respectively along the side face cam groove and the end face cam groove in accordance with the rotation of the operational shaft.

6. A power transmitting apparatus of claim 5 wherein the fork corresponding to the end face cam groove is arranged so that it lies on an extension line of the operational shaft.

7. A power transmitting apparatus of claim 5, wherein the fork corresponding to the side face cam groove is mounted so that its base end straddles on the operational shaft and wherein the fork moves along the side face cam groove, guided by the operational shaft.

8. A power transmitting apparatus of claim 6, wherein the fork corresponding to the side face cam groove is mounted so that its base end straddles on the operational shaft and wherein the fork moves along the side face cam groove, guided by the operational shaft.

* * * * *